United States Patent
Henningsson et al.

[11] Patent Number: 5,992,088
[45] Date of Patent: Nov. 30, 1999

[54] PLANT PROTECTION DEVICE WITH FOLDABLE WATERPROOF PLANT PROTECTION CURTAIN

[75] Inventors: Goran Henningsson; Hans Andersson, both of Kinna, Sweden

[73] Assignee: Ludvig Svensson International, B.V., Netherlands

[21] Appl. No.: 08/776,394

[22] PCT Filed: Jul. 14, 1995

[86] PCT No.: PCT/SE95/00860

§ 371 Date: Nov. 21, 1997

§ 102(e) Date: Nov. 21, 1997

[87] PCT Pub. No.: WO96/02124

PCT Pub. Date: Feb. 1, 1996

[30] Foreign Application Priority Data

Jul. 18, 1994 [SE] Sweden .................................. 9402522

[51] Int. Cl.[6] .................................................. A01G 13/00
[52] U.S. Cl. ................................ 47/26; 47/28.1; 47/31; 160/84.1 R
[58] Field of Search .............................. 47/31, 26, 28.1, 47/FOR 17 FMC, FOR 17 SC; 52/66, 18; 160/84.1 R

[56] References Cited

U.S. PATENT DOCUMENTS

| | | | |
|---|---|---|---|
| 1,061,547 | 5/1913 | Kennedy et al. | 47/26 |
| 2,844,915 | 7/1958 | Woelk | 47/28.1 |
| 3,100,950 | 8/1963 | Heuer | 47/26 |
| 3,123,938 | 3/1964 | Hilliard | 47/28.1 |
| 3,140,563 | 7/1964 | Allen | 47/26 |
| 3,581,436 | 6/1971 | Basiger | 47/26 |
| 4,095,639 | 6/1978 | Ryan | 160/84 |
| 5,083,396 | 1/1992 | Traut | 47/28.1 |
| 5,197,238 | 3/1993 | Peleg | 52/13 |
| 5,265,373 | 11/1993 | Vollebregt | 47/17 |
| 5,451,445 | 9/1995 | Wang | 47/31 |

FOREIGN PATENT DOCUMENTS

| | | | |
|---|---|---|---|
| 274609 | 2/1967 | Australia . | |
| 565280 | 11/1932 | Greece | 47/26 |
| 9200389 | 10/1993 | Netherlands . | |
| 146954 | 1/1990 | Taiwan . | |
| 313703 | 6/1929 | United Kingdom | 47/31 |

*Primary Examiner*—Peter M. Poon
*Assistant Examiner*—Judith A. Nelson
*Attorney, Agent, or Firm*—Woodbridge & Associates, PC

[57] ABSTRACT

Plant protection device in the form of a weather protection extensible over the cultivation. The protection device including a framework (12) consisting of longitudinal and traverse support elements (13, 14) within which at least one waterproof foldable plant protection curtain (16) is extensible from a folded up position and vice versa. The invention also refers to a foldable curtain as a plant protection for cultivations, which curtain (16) has a high tensile strength in it's longitudinal and traverse directions and which via connectors (29) is hung up on a number of support lines (30) stretched across the curtain. The curtain is extensible from a folded up position to an extended position and vice versa, whereby the curtain includes a framework (18) consisting of strips or ribbons and/or lines. The curtain (16) is made of a waterproof laminate and is including relative to the curtain movable stretch or reinforcing lines (22) in essentially parallel rows stretching along the curtain's length. The curtain is provided with a device which in the extended position of the curtain form channels (36).

18 Claims, 11 Drawing Sheets

FIG. 18

PLANT PROTECTION DEVICE WITH FOLDABLE WATERPROOF PLANT PROTECTION CURTAIN

The present invention concerns a plant protection device in the form of a weather protection device that can be pulled over the cultivation consisting of a skeleton of longitudinal and transverse beams forming at least one rectangular area in which at least one waterproof foldable plant protection curtain can be drawn out from a folded up position and vice versa. The invention also concerns a foldable plant protection curtain.

BACKGROUND OF THE INVENTION

Until now greenhouses have traditionally been glass houses, that is, building frameworks of steel elements with glass mounted both on the sides and on the roof. The disadvantages of greenhouses of this type are that they are expensive to build, that it is too warm in them on sunny days, which requires temperature regulation measures, that their thermal insulation is very poor, which means that they require much heating in the winter, that they produce water condensation, that they do not lend themselves to large scale motorised working of the soil, etc. In recent years there are many cases where foldable greenhouse curtains have been mounted under saddle shaped greenhouse roofs. The greenhouse curtains can be used to regulate the amount of shadow and the temperature conditions and humidity to a certain extent.

Simple plant growing systems of the type described in U.S. Pat. No. 5,265,373 have been proposed which consist of pole constructions bound together on top by a framework which forms open horizontal or slightly sloping frame areas on which double foldable plant protection curtains are mounted so that the shadowing curtain can cover the whole frame area or leave it open. If frost protection is desired the shadowing curtain can be detached from the control cords and another curtain in the same frame area can be attached to them. If the shadowing curtain is perforated water cannot accumulate on it, but if the curtains are to serve as frost protection they must be waterproof. The problem is how to achieve water run off without formation of water pockets and how to support the weight of snow on a thin wire system. Solutions to these problems are not given in this document.

Through EP-A1-028 282 insulation for buildings in the form of halls, for example greenhouses, is known which consist of bubble films foldable in a zigzag pattern so that they can be used to insulate the inside of the glass roof or sides of the greenhouse as desired. The film is hung up via holders in wires and the opening width of the film folds can be regulated by changing the length of the spacers attached between the zigzag folds. Both in the bottom and in the upper part of the folds there are holes in the film for draining condensation water or for ventilating the multilayered film.

CA-A1-2,094,775 proposes a drainage system for retractable roofs in the form of membranes where wires have been drawn at even distances parallel to the roof ridges of the greenhouse to which the membranes lying on the roof trusses are attached with fasteners. This method of mounting the otherwise loose membranes means that they form a large number shell shaped depressions hung up at four points so that large amounts of water can accumulate, especially when the slope of the roof trusses is small.

THE GOAL OF THE INVENTION AND ITS MOST IMPORTANT CHARACTERISTIC FEATURES

The goal of the invention is to achieve a plant protection device and a waterproof foldable plant protection curtain which is essentially transparent to sunlight, can bind condensation water on its underside through capillary forces, can be stretched sufficiently so that water pockets are not formed and is so designed that snow loading is avoided. This has been achieved through the characteristic features given in the claims.

DESCRIPTION OF THE DRAWINGS

In the following the invention will be described in more detail in several exemplifications with reference to the drawings.

DESCRIPTION OF EXEMPLIFICATIONS

Figure 1:
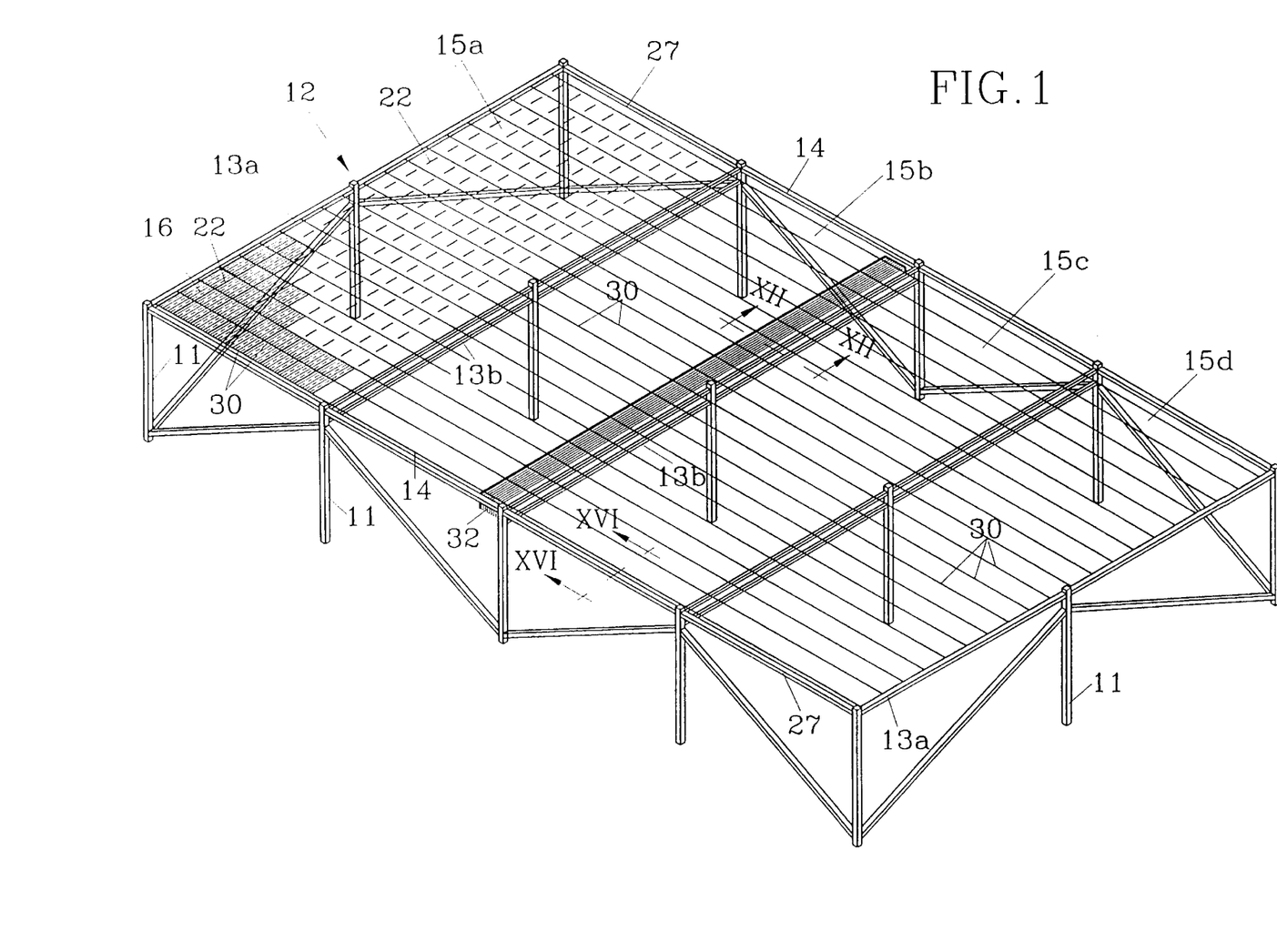
FIG. 1 shows a plant protection device in perspective with plant protection curtains according to the invention partly closed and partly open.

In FIG. 1 a plant protection device 10 is shown which includes a number of spaced poles 11 in rows which support a framework 12 consisting of longitudinal and transverse support elements 13, 14. The framework 12 forms a number of rectangular areas 15 in which at least one foldable waterproof plant protection curtain 16 is extendible from a folded up position (shown in area 15b) to a position covering the whole area 15a.

Figure 2:
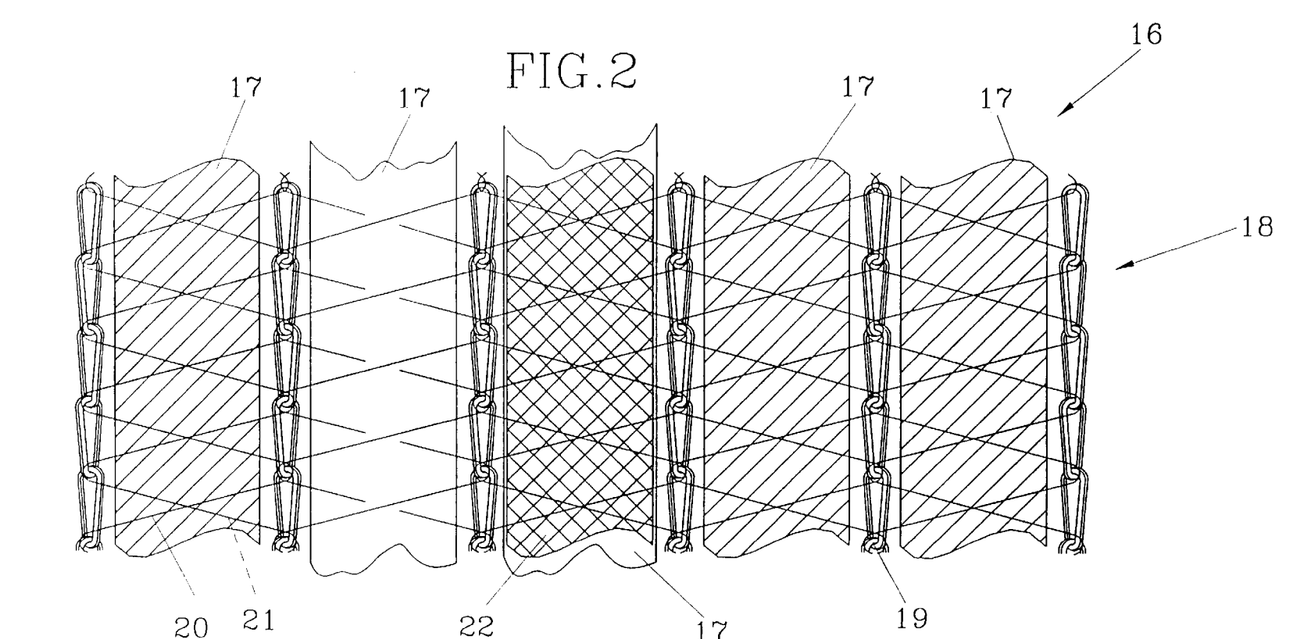
FIG. 2 shows schematically on an enlarged scale the mesh design of a crocheted curtain before it is laminated with a plastic coating.
Figure 3:
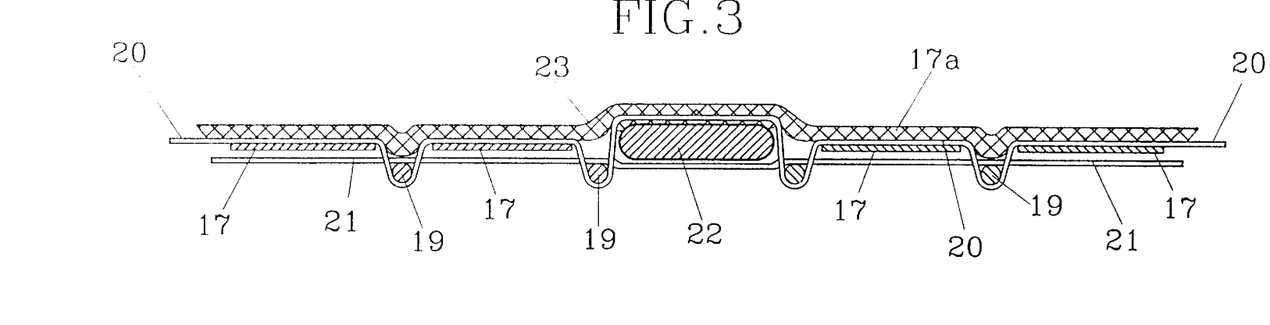
FIG. 3 shows a cross section of the curtain according to FIG. 2 after lamination.

The curtain 16 shown in FIGS. 2 and 3 consists of a large number of small strips 17 connected together by textile lines which form a yarn framework 18 produced by a weaving technique. The ribbons are arranged tight against each other edge to edge with only thin yarn lines between them so that they form an essentially continuous surface. To show the mesh design the distance between the ribbons 17 has been exaggerated in the drawing. To fasten the ribbons as well as possible the yarn frameworks consist of longitudinal connecting lines 19 and transverse fixation lines 20 and 21 on both sides of the ribbons.

In order that the curtain withstand forces due to weather and wind and also to prevent the occurrence of undesired folds which can impede water run off, it is necessary that it be stretched in the frame area 15. For that purpose a ribbon is supplemented at even intervals, for example 30–40 cm, by a stretch line 22, the width of which is equal to or less than the width of the ribbon 17a so that it covers the stretch lines on one side of the curtain.

The thus produced curtain is then covered on one side by a surface layer 23 of an appropriate plastic material which preferably is of the same sort as the yarn material in the curtain and possibly also the strips. A group of materials that has shown itself appropriate is polyolefins, in which product group are included polyethylene and polypropylene. The plastic layer or lamination is appropriately made by pressing the softened plastic in the pressurised region between two rollers into the curtain so that the top side has a smooth waterproof surface while the bottom side still retains some textile character. The ribbons 17 are for the purpose of preventing the stretch lines 22 from being cast in the plastic material so that the stretch lines can be moved longitudinally while the other yarn framework 18 with ribbons is firmly attached to the plastic where the yarn framework and to a certain extent also the ribbons comprise a reinforcement in the laminate.

Figures 4A, 4B:
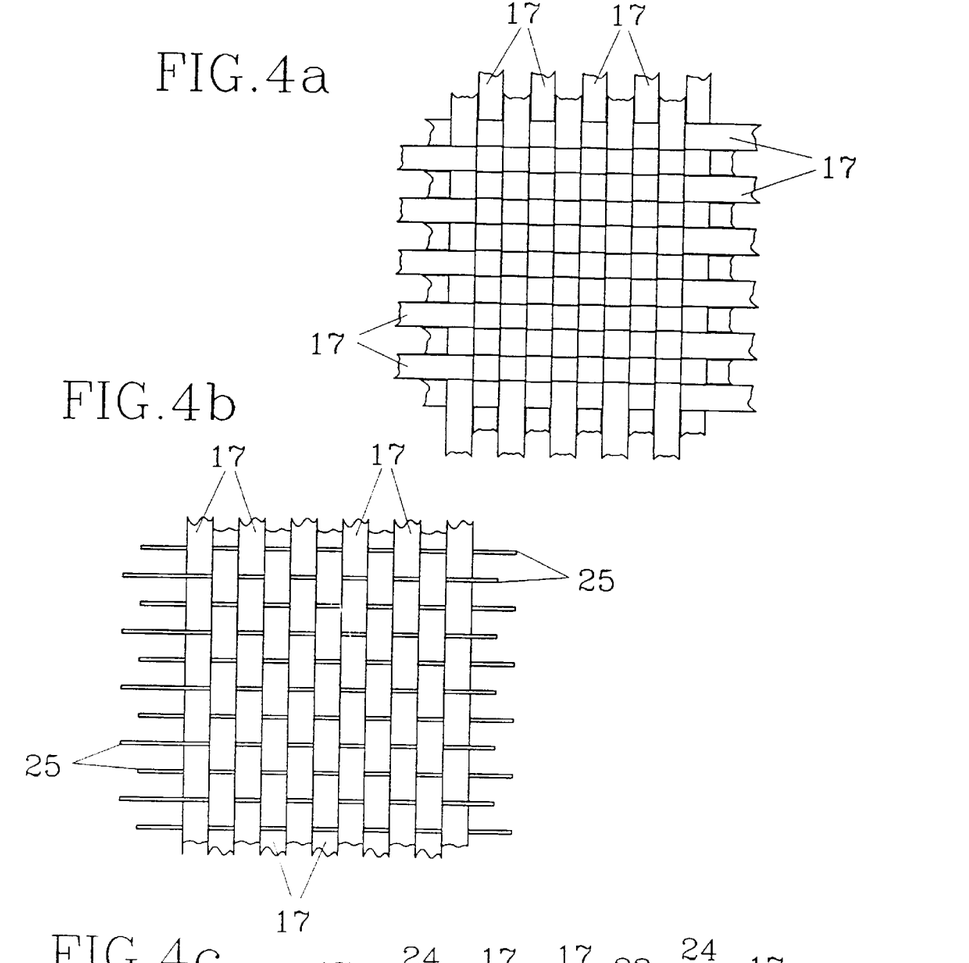
FIGS. 4a, 4b and 4c show schematically on an enlarged scale the mesh design of three alternatively crocheted curtains before lamination.
Figure 4C:
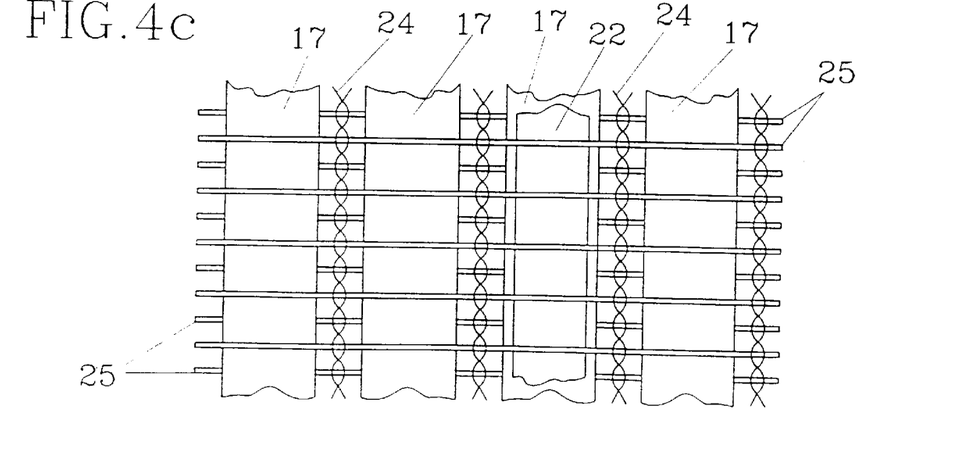

Instead of crocheting the curtain it can also be woven of ribbons 17 in both the warp and weft directions according to FIG. 4a. Another alternative—FIG. 4b—is that only the warp be composed of ribbons 17 while the weft consists of textile fibers 25. According to a third alternative—FIG. 4c—the warp consists of ribbons 17 possibly strengthened by reinforcing lines 24 while the weft consists of textile lines 25 in the form of twisted two or four part bindings as shown in FIG. 4c. The woven curtain is then laminated with a plastic layer 23 in the way described above. Also here stretch lines 22 have been woven into the curtain which is protected on one or both sides by ribbons 17 so that the stretch lines are freely movable longitudinally in the curtain also after covering it with plastic.

The stretch lines 22 can also be covered with a material which prevents the surface layer from being attached to the stretch lines during lamination. They can also consist in totality of such a material, which for example can be Teflon.

The choice of the strips composing the curtain is dictated by a number of different requirements, namely whether they are to be poor emitters, transparent, semitransparent, mainly UV opaque or in some other specific way. A wish can be that the material in the ribbons be flame resistant, for example.

If the curtain is to prevent water condensation its underside must be a fiber system, for example of the textile character mentioned above, which can absorb water and transport it away by capillary action. If it is desired to cover both sides with waterproof layers the condensation water can be bound by a flocked fiber covering, for example. Another way of preventing or in any case reducing condensation water drip is to add a surface tension reducing chemical to the polymer.

Figure 5:
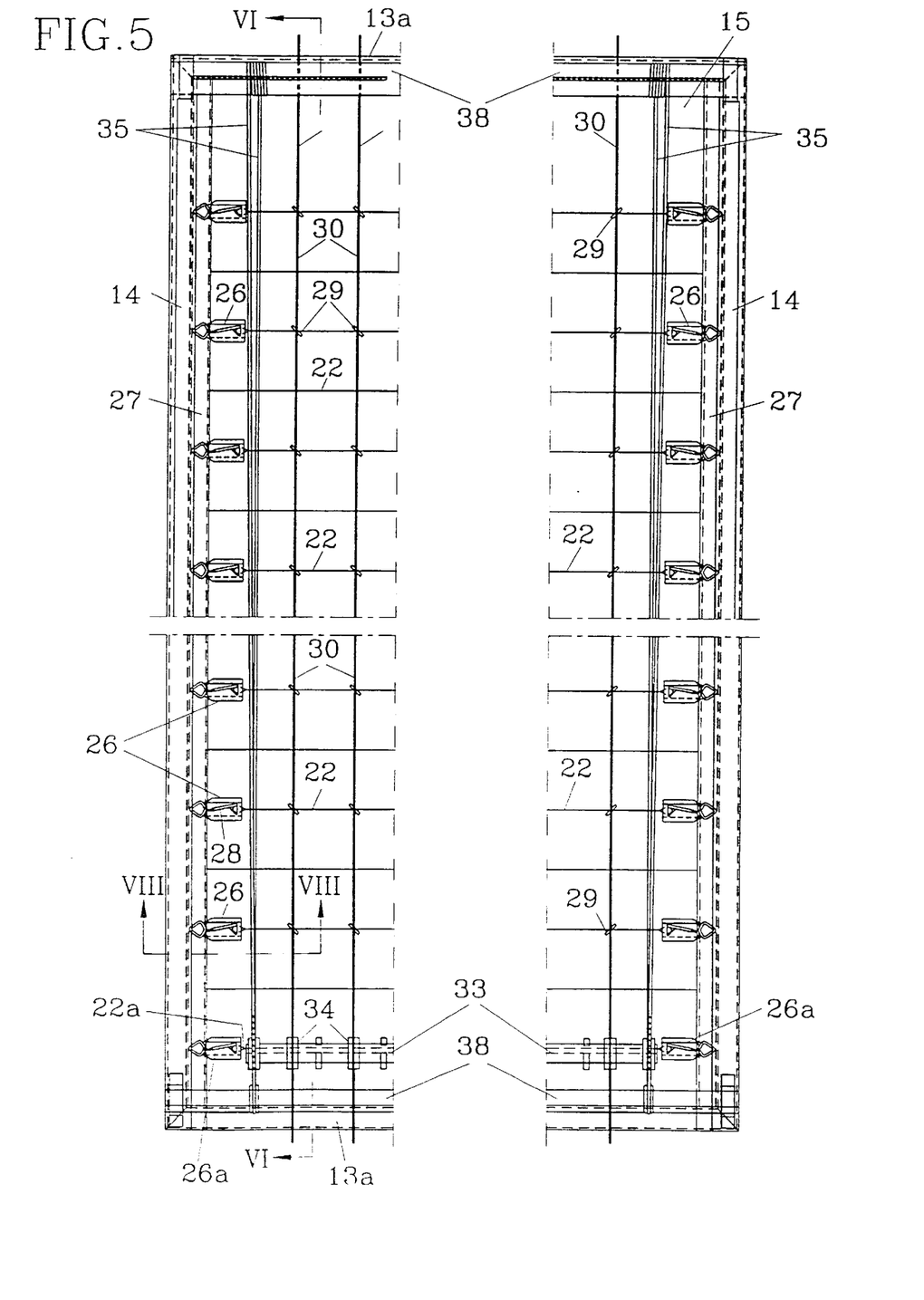
FIG. 5 shows a top view of a frame area of the plant protection device shown in FIG. 1 with the plant protection curtain in extended position.
Figure 6:
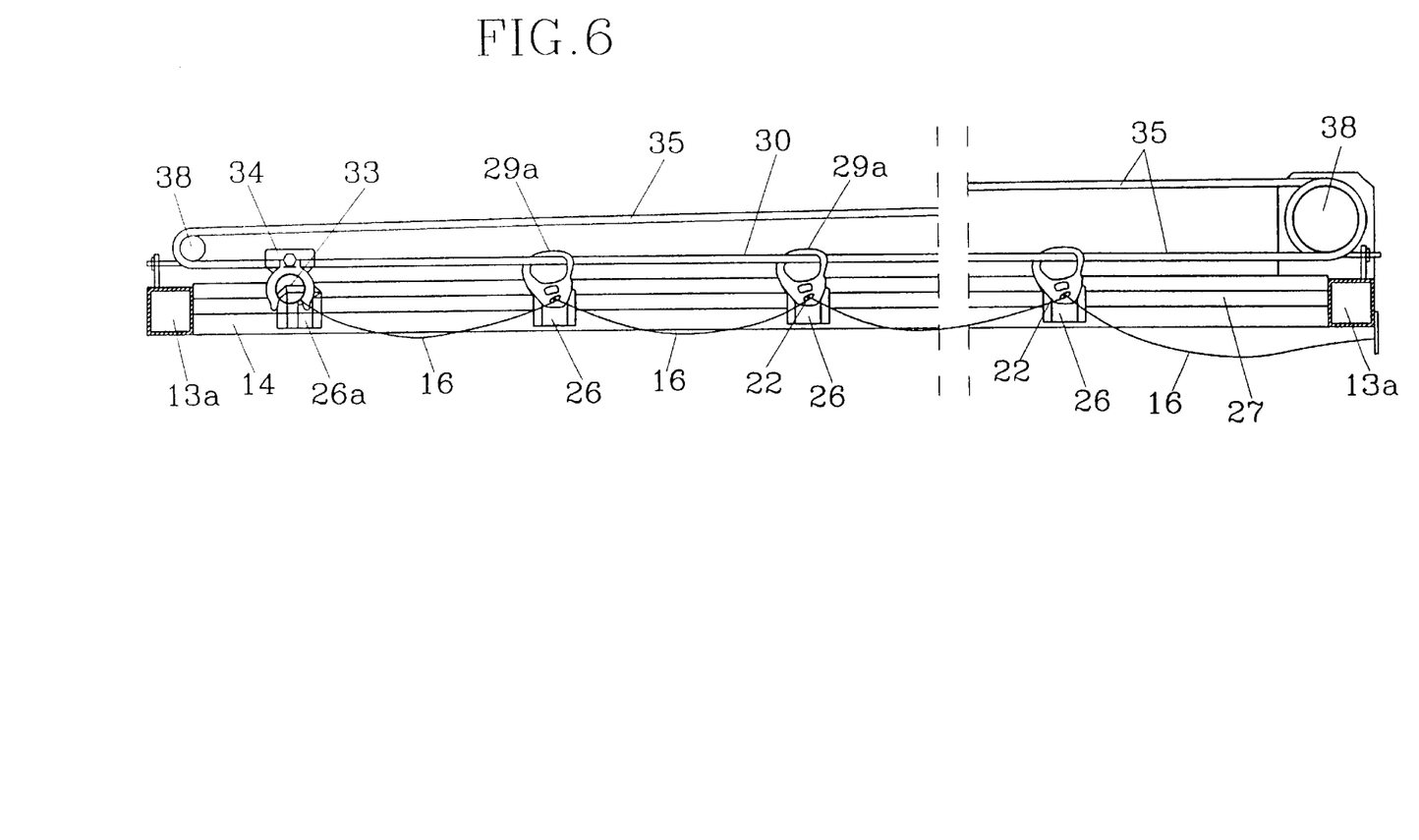
FIG. 6 shows a section along line VI—VI in FIG. 5.
Figure 7:
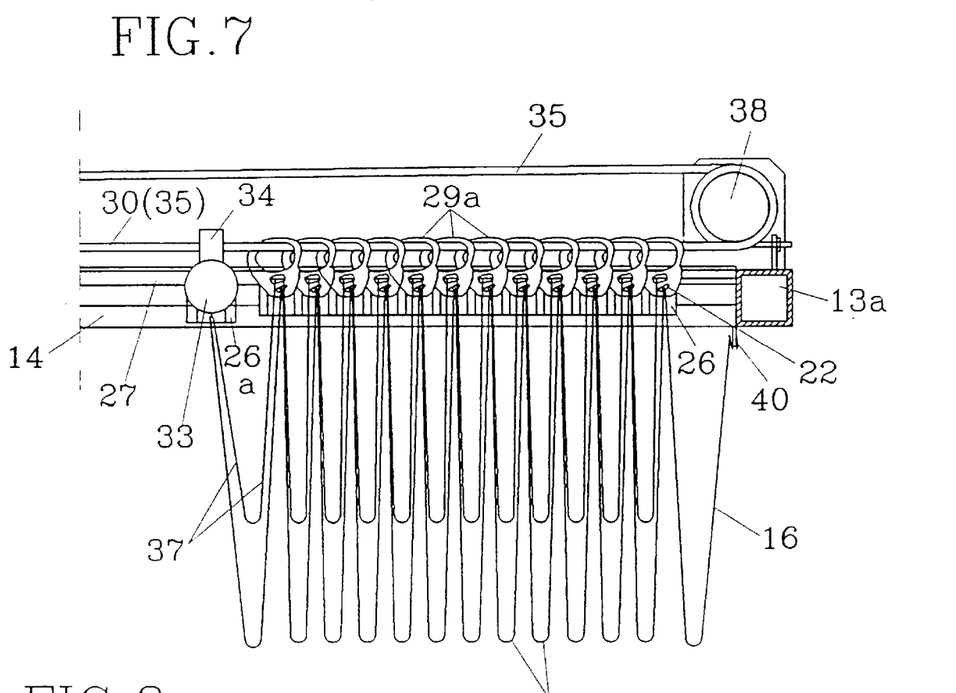
FIG. 7 shows a cross section through part of the plant protection device according to FIG. 5 with the curtain in retracted position.
Figure 8:
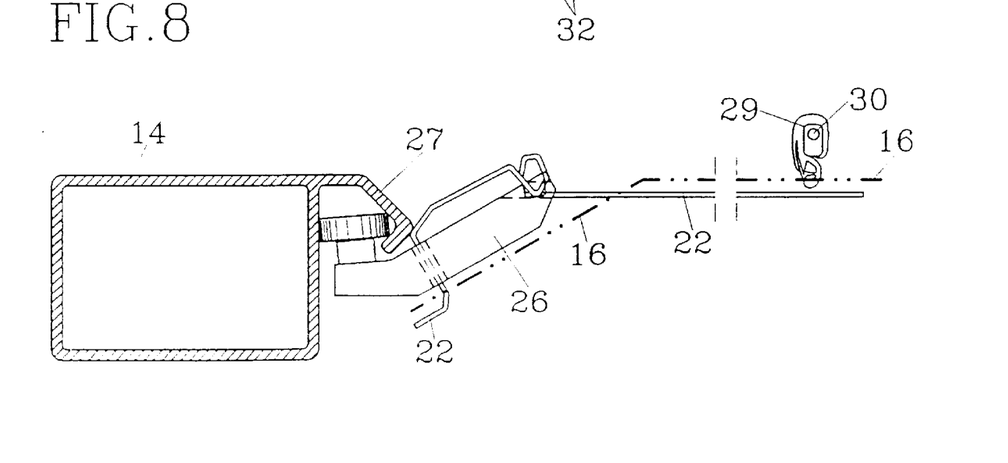
FIG. 8 shows a cross section along line VIII—VIII in FIG. 5.

In the exemplification shown in FIGS. 5, 6 and 7 the stretch lines 22 are integrated in the curtain 16 where they have the double function of stretch lines and reinforcing lines. The stretch lines are free at both ends each of which is attached to a runner 26 in rolling contact with a guide 27 attached to the transverse support element 14. The runners 26 are equipped with a stretching device 28 which makes it possible to stretch the stretch lines 22 between the support element 14. Those parts form together a carrying device 9.

With a spacing of 40–60 cm between the stretch lines 22 the curtain 16 is via connectors 29 carried by support lines 30 arranged across the stretch lines. The support lines 30 are fastened to the longitudinal support element 13a at a somewhat higher level than the stretch lines 22. In this exemplification the connectors 29 consist of hooks 29a (modified relative to the ones described in WO 92/12621) which have been attached to the curtains so that the hooks grip under the stretch lines 22, which means that they are tightly fastened to the curtains but can still move along their lengths relative to the curtains. This connection also means that the curtain is divided into stationary upper folding parts 31 along the stretch lines 22, while the curtain between the stretch lines 22 forms softer folds in its lower parts 32.

Figure 12:
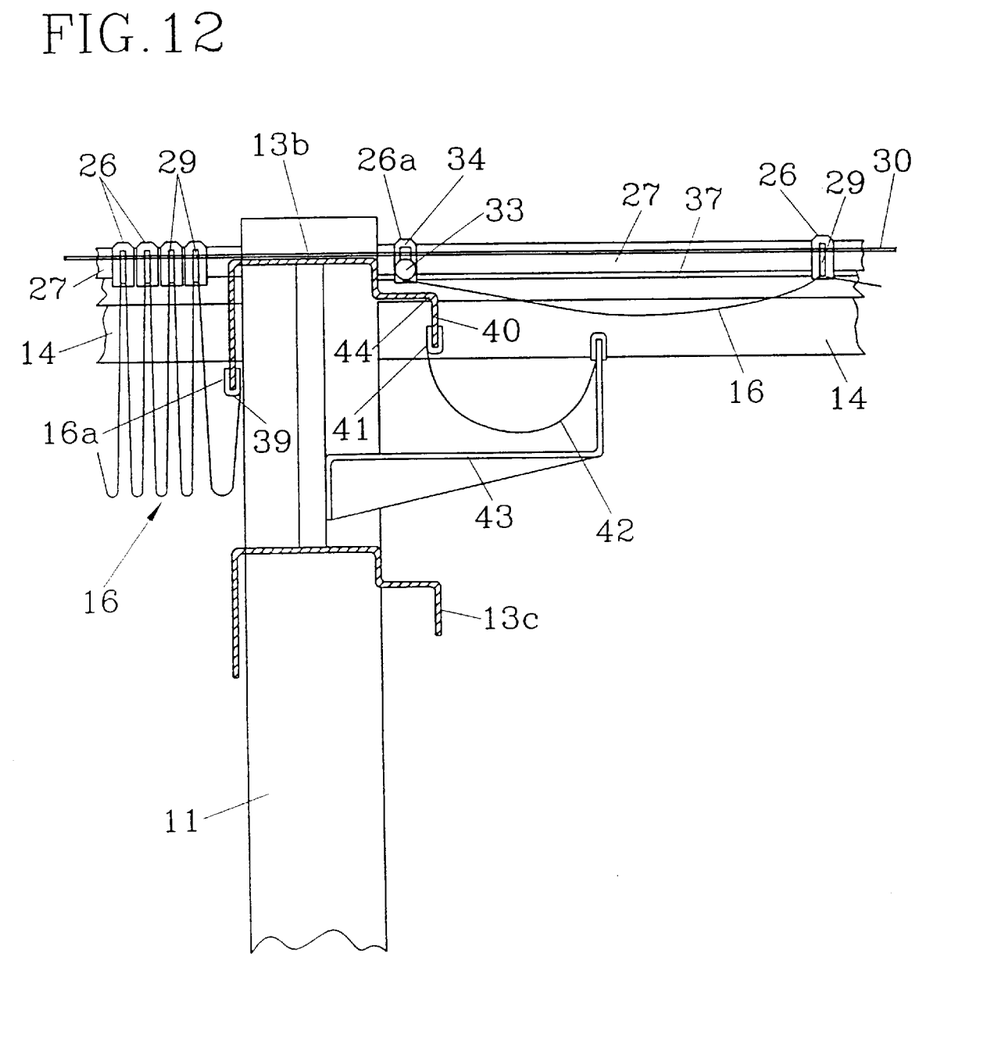
FIG. 12 shows a cross section along line XII—XII in FIG. 1 on a larger scale.

Manoeuvring the curtain 16 is accomplished using an carrier 33 which via a glide shoe 34 is carried by the support lines 30 and which is run in the guide 27 via a strengthening line 22a and runners 26a at both its ends. Through a number of endless pulling lines 35 spaced at a distance of for example 2–3 meters and run around pulleys 38 mounted on the outer support element 13a, the carriers 33 can be moved along the guides 27 between the support elements, whereby the curtains 16 can be extended from their folded positions according to FIG. 7 next to a longitudinal support element 13a to their extended positions in which the carriers are positioned at the opposite support element 13a or 13b in the same frame area 15 as shown in FIG. 6. The outer longitudinal support element 13a serve as attachments for the support lines 30 while the inner longitudinal support element 13b serve as attachments 39 for one of the curtain's 16 end edge 16a as shown in FIG. 12. Manoeuvring the curtain is appropriately accomplished by a motor not shown which drives one of the pulleys 38. Of course it is possible to couple several curtains together in different frame areas 15 and manoeuvre them simultaneously.

The side of the load bearing beam 13b away from the attachment 39 is in the form of an L-shaped flange 40 at the free end of which there is another attachment 41 for a water gutter 42 the opposite end of which is held up by supports 43 attached to the load bearing beam 13b. In many situations one wants to be able to ventilate the area under the curtains also when it is raining and for that purpose the curtains can be opened a crack somewhat smaller than the width of the water gutter 42 so that a drained ventilation opening is obtained.

In the extended position the end part of the curtain at the carrier closes against the angled part 44 of the L-shaped flange, FIG. 12, and thus overlaps the water gutter 42.

In the exemplifications shown the extended curtain 16 is not plane but rather forms longitudinal channels 36 with the channel tops at the level of the stretch lines 22 and channel bottoms between them. To obtain a specific channel profile there are flexible spacers 37 between the channel tops with shorter lengths than the arc shaped widths of the channels. The spacers 37 thus limit the extension so that the curtains form channels 36 between the stretch lines. The advantage of this compared to a plane surface is that the water run off is controlled in a specified manner while on larger plane surfaces water pockets are easily formed which can become so large that the curtain or the whole plant protection device collapses. The channels according to the invention are supported along essentially their whole length and hung on support lines 30 with a c—c spacing of about 30–40 cm which means that water pockets cannot be formed even during the hardest possible rain. The spacers 37 are appropriately lines, ribbons or the like, for instance composed of so-called loop rope, see FIG. 15, consisting of a rope with a continuous series of crocheted loops 51 placed at even distances from each other corresponding to the distance between the stretch lines 22. The loops 51 are slipped over the connectors 29 whereby the spacing of the channels is determined.

The stretch lines' 22 position parallel to each other and at a relatively short distance from each other, for example 40–50 cm, and their tight stretch between the support element 14 means that in extended position the curtain can be stretched out completely flat during dry weather, that is, the spacers are absent and that channel formation occurs only on loading with water during precipitation.

Figure 9:
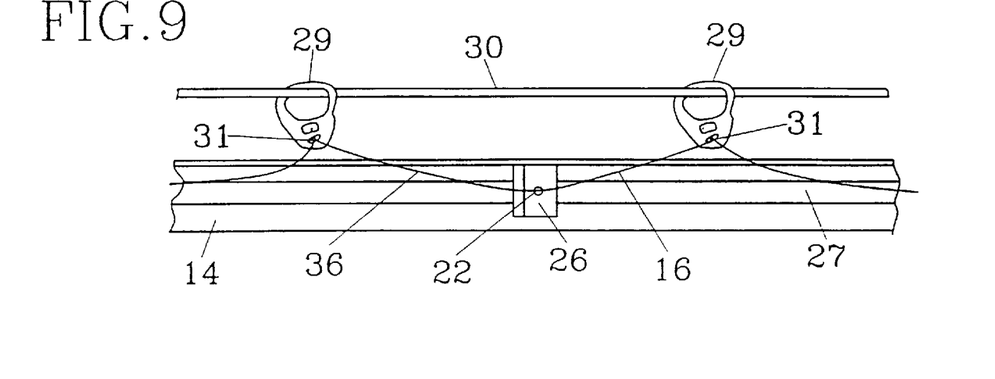
FIG. 9 shows a cross section through part of a modified plant protection device according to the invention with the curtain in extended position.
Figure 10:
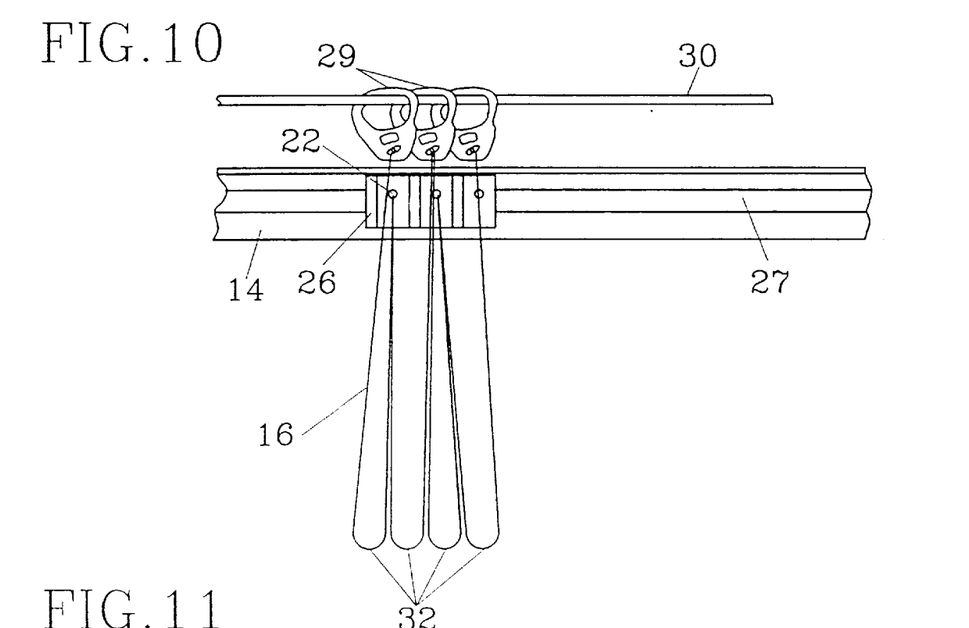
FIG. 10 shows a cross section analogous to that of FIG. 9 with the curtain in retracted position.
Figure 11:
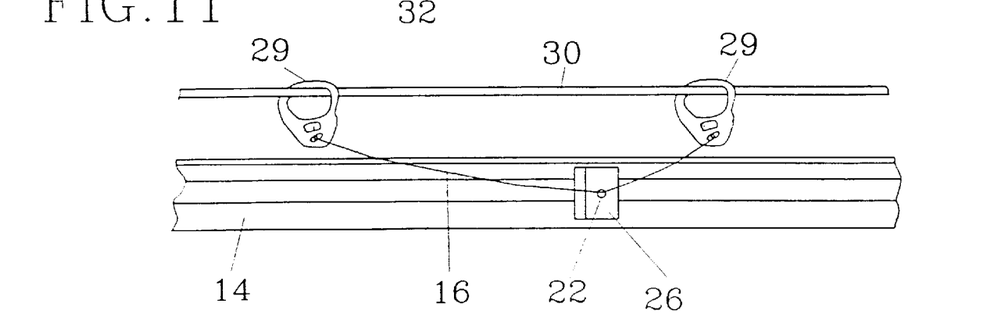
FIG. 11 shows a cross section through part of a further modified plant protection device with an asymmetrically drawn curtain.

The stretch lines 22 need not necessarily be attached to the channel tops as shown in the previous exemplification but can be attached in the bottom of the channels as shown in FIGS. 9, 10 and 11, that is just between the upper folding parts 31 of the curtain track 16, in which case the guide 27 is placed at a lower level. Strengthening lines 22a which distribute the load to the attachments over a longer distance are placed in the upper folding parts 31. A reason for placing the stretch lines 22 in the bottom of the channels instead of in the upper parts 31 is that the channel bottoms can better be stretched up thus preventing folds in the channel 36. Furthermore no spaces 37 are necessary, since the curtain in streched position is forming natural channels 36.

The stretch lines 22 can also be arranged asymmetrically in relation to the upper folding parts 31 as shown in FIG. 11 whereby the folded curtain packets' width can be reduced compared to the previous exemplification. It is also possible to have stretch lines both in the upper folding parts 31 and between them.

Figures 13, 14, 15, 16:
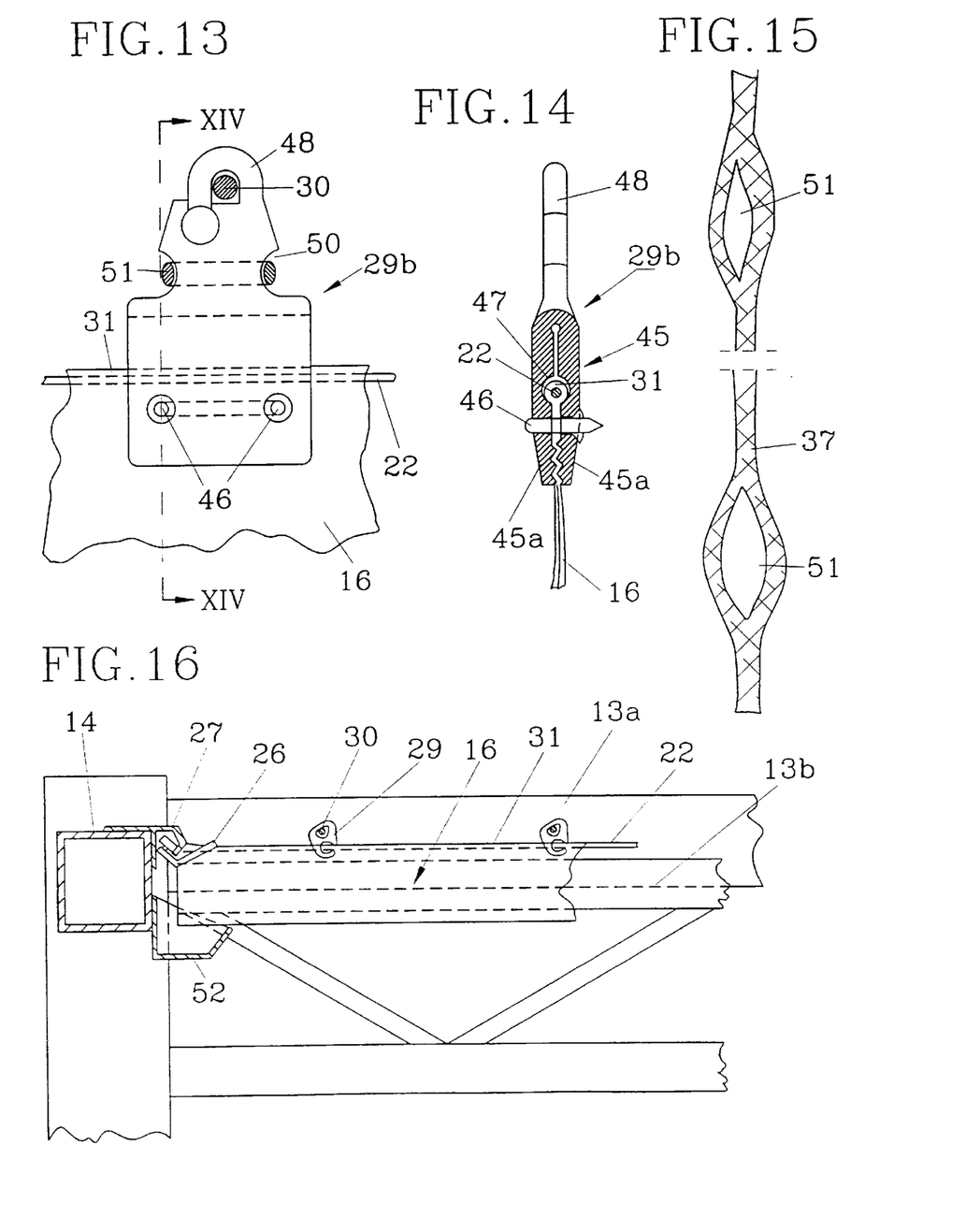
FIG. 13 shows a front view of an alternative connector.
FIG. 14 shows a cross section along line XIV—XIV in FIG. 13.
FIG. 15 shows a short section of a spacer.
FIG. 16 shows a cross section along line XVI—XVI in FIG. 1.

The connectors 29 can be shaped in a number of different ways, as hooks 29a which are applied manually to the curtains or as is shown in FIGS. 13 and 14 as clips 29b of an appropriate plastic material. The clips are U-shaped in cross section between the shanks 45 of which the curtain 16 with included stretch line 22 or reinforcing line 22a can be placed. Two rivets or a double rivet 46 is inserted in a hole in the shanks and through the curtain. The pinning effect itself for holding the curtain tight can be obtained in different ways. In the exemplification shown the shank pressure is achieved by a tong (not shown) which using heat can simultaneously flatten the rivet ends so that rivet heads are formed. The shanks' inside surfaces opposite the stretch lines are shaped with a recess 47 which is large enough that the stretch line 22 is freely movable along its length The recess 47 is performed with a cantilever 53 in the passage to the slott between the shanks 45, where the curtain is clamped. The stretch line can be integrated with the curtain 16 or also it can be loose and for example can already be stretched between the support element before the curtain is placed on the stretch lines and affixed to them by the connectors 29.

In its upper part the clip 29b is shaped with a hook 48 equipped with a wide part 49 at the free end of the hook which wide part can be inserted into a correspondingly shaped recess so that the hook can be secured from withdrawal from its connected position. The hook 48 is hooked on the supporting line 30 and secured. In the transition from the clip and the hook 48 the clip 29b has a neck 50 around which the spacer's 37 loop 51 can be fitted.

The framework 12 is given a slight slope, for example 2 degrees, in the direction of the length of the support element so that the curtains' channels 36 slope to the same extent so that good water drainage is obtained. At the lower end of the channels along the transverse support element 14 water gutters 52 are placed which transport the water to drain pipes (not shown).

Figure 17:
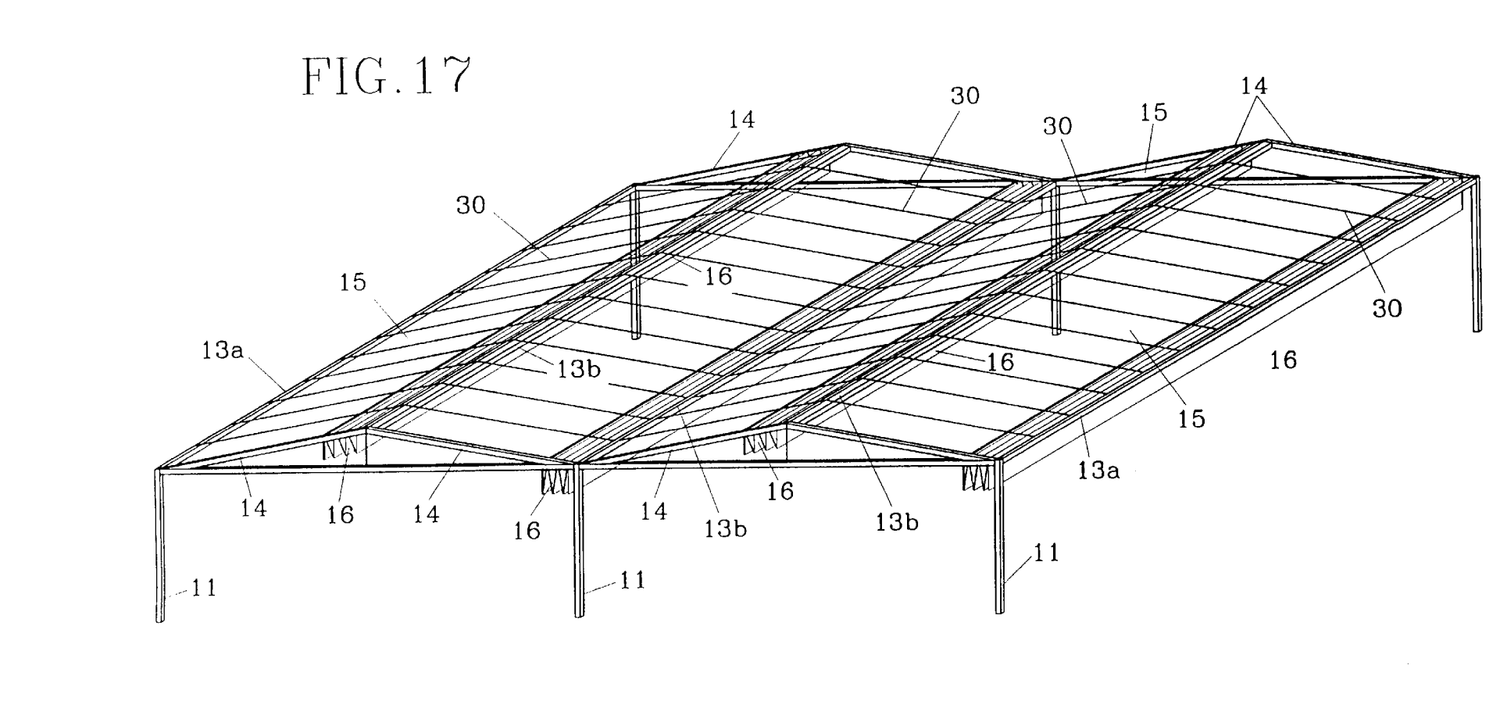
FIG. 17 shows a modified plant protection device in perspective according to the invention with a saddle shaped roof and with the plant protection curtains in retracted position.

As shown in FIG. 17 the invention is not limited to plant protection devices with plane roofs but rather can also be applied to saddle roofs. In that case each frame area 15 forms one part of the slanting saddle roof while the upper frame of the gable roof trusses corresponds to the transverse support element 14 and the main bar of the longitudinal support element 13. The stretch lines 22 are thus stretched between the upper frames and the support lines 30 follow the slopes of the saddle roof. In the same way as in the exemplification according to FIG. 6 the curtain track stretches unbroken from the first main bar 13a to the roof ridge, corresponding to the support element 13b, thence to the roof beam, which is also a support element 13b, and up to the next roof ridge 13b, etc, to the last main bar 13a. Plant protection devices of up to 100 meters' length or more are entirely possible. All of the curtains in each frame area can be manoeuvred simultaneously and be extended or folded up in a single work step.

In the example shown in FIG. 17 the curtain is stretched so that it is essentially plane because the stretch lines are oriented transverse to the run off direction and no real channel formation is desired. The valleys in the channels between two frame areas 15 sloping toward each other, that is, the support element that act as roof beams 13b, should slope slightly so that he water in the channels can run off.

In case of snow in the first instance the usual heat for heating the plant protection should melt the snow so that no thick blankets of snow can build up and should that heat not be sufficient electric wires in the curtains in longitudinal and/or transverse directions can be coupled to an electrical source (alternatively low voltage source) so that direct heating of the curtains can be achieved.

Figure 18:
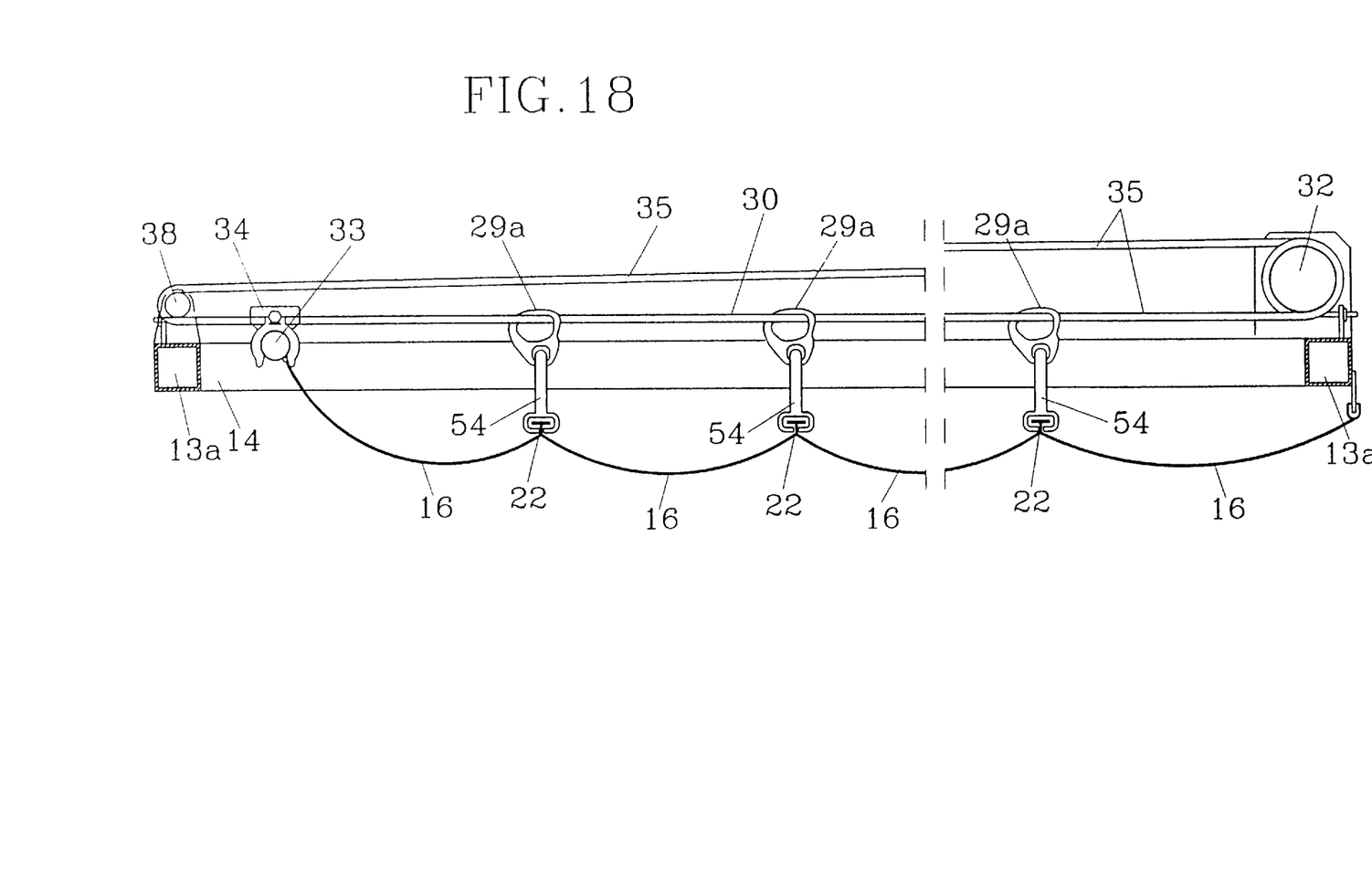
FIG. 18 shows a section through a further modified example according to the invention.

In previous examples streching the curtain is achived by means of the strech lines 22, which by way of runners 26 or the like are movable along the transverse support element 14 of the framework 12. In FIG. 18 the strech lines 22 are replaced by bars 51, which are fastend to the upper folding part of the curtain or adhered in other way. The purpose of the bars are to keep the curtain streched along the entire length between the transverse support elements 14, however without being connected to them. The bars 51 are carried via the connectors 29, for example via the hooks 29a, by the support lines 30.

Alternative the bars 54 can be designed with rigid connecting devices in a similar way as the clips 29b in FIGS. 13 and 14, where the bars 54 constitute laterally extended carriers.

List of Reference Designations 9 carrying device
10 plant protection device
11 poles
12 framework 13 longitudinal support elements
14 transverse suport elements
15 rectangular areas
16 plant protection curtain
17 ribbons
18 framework
19 connecting lines
20 fixation lines
21 fixation lines
22 stretch line
22a strengthening line
23 surface layer=plastic coating
24 reinforcing lines
25 weft lines
26 friction reducing device for example runner
27 guide
28 stretching device
29 connector
29a hook
29b clip
30 support lines
31 upper folding part
32 lower folding part
33 carrier
34 glide shoe
35 pulling lines
36 channels
37 spacer
38 pulleys
39 attachment
40 flange
41 attachment
42 water gutter
43 supports
44 angled part
45 shanks
46 double rivet
47 recess
48 hook
49 wide part
50 neck
51 loop
52 water gutter
53 cantilever
54 bars

We claim:

1. A plant protection device in the form of a weather protection extendible over the cultivation comprising:

a framework comprised of two or more longitudinal support elements in substantially parallel relation to each other and two or more transverse support elements in substantially parallel relation to each other and in substantially perpendicular relation to said two or more longitudinal support elements, wherein each of said two or more longitudinal support elements is connected to at least two of said transverse support elements thereby forming said framework;

one or more water proof foldable plant protection curtains within the interior area delimited by said framework, said one or more curtains being reversibly moveable between an extended position and a foldable up position;

one or more support lines attached to said longitudinal support elements in substantially parallel relation to each other and in substantially parallel relation to said two or more traverse support elements, wherein each of said one or more support lines is attached to and thereby extended between at least two of said longitudinal support elements;

one or more connector means for moveably connecting said one or more curtains to said one or more support lines; wherein each of said one or more connector means is connected to one of said one or more curtains and is moveably engaged with and supported by one of said one or more support lines such that said connector means can move along the length of said support line and one or more carrying means attached to said one or more curtains for moveably supporting said one or more curtains in said framework, said one or more carrying means being disposed in substantially parallel rows, wherein said rows extend along said one or more curtains and are substantially perpendicular to said one or more support lines;

wherein said one or more curtains form arc-shaped channels between said carrying means when in the extended position.

2. The plant protection device of claim 1, further comprising one or more spacers having a length shorter than the width of said arc-shaped channels.

3. The plant protection device of claim 1 wherein said carrying means are comprised of stretch lines which are movably stretched between two of said transverse support elements, across and perpendicular to said support lines.

4. The plant protection device of claim 1 wherein said carrying means are comprised of bars fastened to said curtains and moveably hung on said support lines.

5. The plant protection device of claim 3, further comprising guiding means along said transverse support elements; and friction reducing means on each of two ends of said stretch lines for moving in said guiding means.

6. The plant protection device of claim 1 wherein said curtains comprise upper folding parts, and wherein said stretch lines are arranged in or at said upper folding parts or in the curtain between them.

7. The plant protection device of claim 3, said curtains further comprising connectors attached to said stretch lines.

8. The plant protection device according to claim 1 wherein said connector means are arranged at the intersection between said support lines said carrying means.

9. The plant protection device of claim 6, wherein said connectors have a recess for longitudinally movable attachment of said stretch lines.

10. The plant protection device of claim 9, wherein said connectors are shaped to include cantilevers for transferring pulling forces on the stretch lines to said connectors on said curtain.

11. The plant protection device of claim 1 wherein one of said curtains longitudinal edges is attached to one of said longitudinal support elements, and further comprising a carrier attached to said curtain's opposite longitudinal edge; and a driving means for moving said carrier between said longitudinal support elements and extending said curtain.

12. The plant protection device of claim 1, further comprising a stationary water gutter which is located along one of said longitudinal support elements below said curtain.

13. The plant protection device of to claim 1, further comprising one or more spacers comprised of a loop rope having a continuous series of loops wherein the distance between said loops corresponds to the distance between said curtains' upper folding parts when they form channels between them.

14. The plant protection device of claim 1 wherein said one or more foldable curtains are comprised of:

a framework of strips;

moveable reinforcing lines across the width of said curtain, in essentially parallel rows spaced along the curtain's length;

two or more upper folding parts wherein said curtain forms arc-shaped channels between said upper folding parts; and means which maintains said channels when the curtain is extended into the extended position, wherein said reinforcing lines are integrated in said framework and arranged in the upper folding parts, in the arc shaped part of a curtain channel, or both, wherein said curtain is comprised of a waterproof laminate.

15. The plant protection device of claim 14 wherein said strips are composed of a flexible material, wherein said curtain is covered by a waterproof layer on at least one side forming a laminate.

16. The plant protection device of claim 15, wherein some of said flexible strips are supplemented with longitudinal reinforcing lines, wherein said strips are shaped to cover the respective reinforcing line on the side against which the covering material is applied so that the stretch line is freely movable longitudinally within the laminate.

17. The plant protection device of claim 15, characterized in, that the stretch lines' having a surface or being covered by a material which prevents the surface layer from sticking to the stretch lines.

18. The plant protection device of claim 14, characterized in, that the curtain in its length and/or width is provided with electrical resistance wires, which can be plugged into an electric source, the electrical resistance wires preferably being placed in the area around the curtain's intermediate arc shaped part.

* * * * *